3,803,136
5-HYDROXY - 1 - {[5-(SUBSTITUTED PHENYL)
FURFURYLIDENE]AMINO}HYDRANTOINS
Thomas J. Schwan and Ralph L. White, Jr., Norwich,
N.Y., assignors to Morton-Norwich Products, Inc.
No Drawing. Filed Aug. 23, 1972, Ser. No. 283,057
Int. Cl. C07d 5/16
U.S. Cl. 260—240 G        9 Claims

ABSTRACT OF THE DISCLOSURE

The titled compounds are useful as skeletal muscle relaxants.

---

This invention is concerned with compounds of the formula:

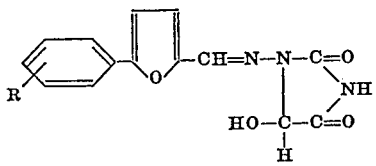

wherein R in the 4-position is nitro, chloro, fluoro, amino or cyano, in the 3-position trifluoromethyl; and in the 3,4-position dichloro.

These compounds possess pharmacological properties. They are particularly distinguished by their effect upon skeletal muscle. When administered intravenously in a dose of from 10–30 mg./kg. in a vehicle such as aqueous mannitol-sodium hydroxide, dimethylsulfoxide or tetrahydrofurfuryl alcohol to curarized pithed rats, a method adapted from that described in J. Gen. Physiol. 47:987–1001 (1964), marked muscle relaxant effects as evidenced by the inhibition of the twitch response, are elicited upon the gastrocnemius muscle.

The method which is now preferred for preparing the compounds of this invention is set forth in the following illustrative examples.

EXAMPLE I

1-{[5-(p-nitrophenyl)furfurylidene]amino}-5-hydroxyhydantoin (A) In a 3.0 l. flask equipped with condenser, drying tube, stirrer, and dropping funnel was placed 114 g. (0.70 mole) of benzaldehyde semicarbazone in 1.0 l. of anhydrous diethyl ether. Oxalyl chloride (64 ml. 0.75 mole) was added dropwise during 30 minutes rapidly enough to maintain a gentle reflux, and the solution was stirred another 2.5 hours after completing the addition. The solid was collected by filtration and recrystallized from 3.5 l. of 2-propanol to yield 119 g. of 1-(benzylideneamino) parabanic acid, M.P. 205–207°.

Analysis.—Calcd. for $C_{10}H_7N_3O_3$ (percent): C, 55.30; H, 3.25; N, 19.35. Found (percent): C, 55.19. H, 3.24; N, 19.30.

(B) In 500 ml. of methanol were placed 87 g. (0.40 mole) of (A) and 20 g. of 5% palladium on charcoal (50% water). Hydrogenation on a Parr apparatus gave uptake of two equivalents of hydrogen in two hours, with temperature increasing from 25° to 39°. An additional 20 g. of 5% palladium on charcoal (50% water) was then added. Uptake of the third equivalent required seven hours, with a total of 92% of the theoretical hydrogen uptake being observed.

The reduced solution was filtered and the catalyst was washed with 500 ml. of methanol. The combined methanol solutions were added to 87 g. (0.40 mole) of 5-(p-nitrophenyl)-2-furaldehyde, 2.0 l. of methanol, and 40 ml. of concentrated hydrochloric acid. The mixture was refluxed for two hours and then filtered while hot. The collected solid was dried to give 20 g. (15%) of title compound, M.P. 229–230°.

Analysis.—Calcd. for $C_{14}H_{10}N_4O_6$ (percent): C, 50.91; H, 3.05; N, 16.97. Found (percent): C, 51.05; H, 3.10; N, 16.93.

EXAMPLE II

1-{[5-(p-chlorophenyl)furfurylidene]amino}-5-hydroxyhydantoin

In 500 ml. of methanol were placed 87 g. (0.40 mole) of the compound of Example I (A) and 40 g. of 5% palladium on charcoal (50% water). Hydrogenation of a Parr apparatus gave uptake of 87% of the theoretical amount of hydrogen in 2 hours. The filtered reduction solution was combined with the 200 ml. of dioxane used to wash the catalyst, and the mixture was added to 20.6 g. (0.10 mole) of 5-(p-chlorophenyl)furfural. After addition of 10 ml. of concentrated hydrochloric acid, the mixture was refluxed for one hour and then concentrated to a solid. The crude solid was thoroughly washed with 500 ml. of 50° water for 30 minutes, collected, and air-dried to yield 7.35 g. (23%) of light-yellow solid. A sample was recrystallized from nitromethane to M.P. 220–221°.

Analysis.—Calcd. for $C_{14}H_{10}ClN_3O_4$ (percent): C, 52.59; H, 3.15; N, 13.15. Found (percent): C, 52.59· H 3.11; N, 13.29.

EXAMPLE III

1-{[5-(p-fluorophenyl)furfurylidene]amino}-5-hydroxyhydantoin

In methanol (500 ml.) are placed 87 g. of the compound of Example I(A) and 40 g. of 5% palladium on charcoal (50% water). Hydrogenation or a Parr apparatus at a maximum of 40 p.s..i. allowed an uptake of 91% of the theoretical three moles of hydrogen in 24 hours. The filtered reduction solution was added to 5-(p-fluorophenyl)-2-furaldehyde (28 g. 0.15 mole). After addition of concentrated hydrochloric acid (10 ml.), the solution was stirred for four hours without heating. The mixture was concentrated to a solid under reduced pressure (water bath 35–50°), and the resulting solid was washed with benzene (500 ml.) and collected. The solid was added to 1.0 l. of 50° water and the mixture was stirred for 30 minutes and then filtered. The collected yellow solid (15 g.) was recrystallized from nitromethane (2500 ml.) to yield light cream solid (12 g. 26% yield), M.P. 219–221°.

Analysis.—Calcd. for $C_{14}H_{10}FN_3O_4$ (percent): C, 55.45; H, 3.32; N, 13.86. Found (percent): C, 55.27; H, 3.40; N, 13.97.

EXAMPLE IV

1-{[5-(p-aminophenyl)furfurylidene]amino}-5-hydroxyhydantoin

In a solution of absolute ethanol (500 ml.) and cyclohexene (500 ml.) were placed 16 g. (0.050 mole) of the compound of Example I(B) and 5% palladium on charcoal (10.0 g. 50% water). The mixture was refluxed 17 hours, cooled and filtered. The insoluble filtered solid was boiled in a solution of absolute ethanol (1.0 l.) and water (50 ml.), and the hot mixture was filtered. The filtrates were combined and concentrated to a solid which was rinsed with cold alcohol (200 ml.) and dried to yield the title compound (7.9 g. 53%). A sample was recrystallized by dissolution in 100 ml. of alcohol, concentration to 50 ml. and cooling to yield light brown crystals, M.P. 216–218°.

Analysis.—Calcd. for $C_{14}H_{12}N_4O_4$ (percent): C, 56.00; H, 4.03; N, 18.66. Found (percent): C, 55.60; H, 4.10; N, 18.32.

EXAMPLE V 5-hydroxy-1-{[5-(m-trifluoromethyphenyl)furfurylidene]-amino}-hydantoin In methanol (750 ml.) were placed the compound of Example I(A) (160 g. 0.74 mole) and platinum oxide (7.0 g.). Hydrogenation on a Parr apparatus at a maximum of 45 p.s.i. allowed an uptake of 55% of the theoretical three equivalents of hydrogen in six hours. The mixture was filtered and the filtrate was brought to 900 ml. volume.

5-(m-trifluoromethylphenyl)-2-furaldehye (24.0 g., 0.1 mole) was dissolved in hot methanol (400 ml.) and concentrated hydrochloric acid (10 ml.). To this solution at 30° was added the filtrate (300 ml.), and the mixture was stirred for four hours and allowed to stand overnight. The mixture was concentrated to 300 ml. volume and cooled. Filtration yielded white solid which was washed with water (400 ml.), air-dried, and washed with hexane (200 ml.) to yield white solid (20 g., 57%), M.P. 210–212°.

*Analysis.*—Calcd. for $C_{15}H_{10}F_3N_3O_4$ (percent): C, 51.00; H, 2.85; N, 11.90. Found (percent): C, 51.29; H, 2.97; N, 11.89.

EXAMPLE VI

1-{[5-(p-cyanophenyl)furfurylidene]amino}]-5-hydroxyhydantoin

In methanol (750 ml.) were placed the compound of Example I(A) (160 g. 0.74 mole) and platinum oxide (7.0 g.). Hydrogenation on a Parr apparatus at a maximum of 45 p.s.i. allowed an uptake of 55% of the theoretical three equivalents of hydrogen is six hours. The mixture was filtered and the filtrate was brought to 900 ml. volume.

5-(p-cyanophenyl)-2-furaldehyde (20 g., 0.10 mole) was dissolved in hot methanol (1.0 l.) and concentrated hydrochloric acid (10 ml.) was added. To this solution at 30° was added the filtrate (300 ml.), and the mixture was stirred for four hours and allowed to stand overnight. Filtration yielded 17 g. of green solid which was recrystallized from nitromethane to yield 14 g. (45%) of light brown product, M.P. 224–226°.

*Analysis.*—Calcd. for $C_{15}H_{10}N_4O_4$ (percent): C, 58.06; H, 3.25; N, 18.06. Found (percent): C, 57.86; H, 3.31; N, 17.89.

EXAMPLE VII

1-{[5-(3,4-dichlorophenyl)furfurylidene]amino]}-5-hydroxyhydantoin

In methanol (750 ml.) were placed the compound of Example I(A) (160 g. 0.74 mole) and platinum oxide (7.0 g.). Hydrogenation on a Parr apparatus at a maximum of 45 p.s.i. allowed an uptake of 55% of the theoretical three equivalents of hydrogen in six hours. The mixture was filtered and the filtrate was brought to 900 ml. volume.

5-(3,4-dichlorophenyl)-2-furaldehyde (24 g., 0.10 mole) was dissolved in hot methanol (1.0 l.) and concentrated hydrochloric acid (10 ml.) was added. To this solution at 30° was added the filtrate (300 ml.) and the mixture was stirred for four hours and allowed to stand overnight. The mixture was concentrated to 500 ml. volume and the resulting orange solid was collected. The solid was refluxed in nitromethane (600 ml.) for 30 minutes and the pale yellow solid (23 g. 65%) was dried at 100° for 24 hours, M.P. 223–225°.

*Analysis.*—Calcd. for $C_{14}H_9Cl_2N_3O_4$ (percent): C, 47.48; H, 2.56; N, 11.87. Found (percent): C, 47.39; H, 2.58; N, 11.93.

What is claimed is:

1. A compound of the formula

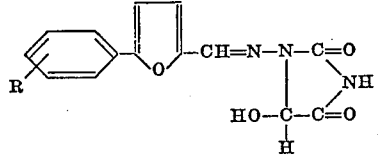

wherein R is the 4-position is nitro, chloro, fluoro, amino, or cyano; in the 3-position trifluoromethyl; and in the 3,4-position dichloro.

2. The compound of claim 1 wherein R is nitro.
3. The compound of claim 1 wherein R is chloro.
4. The compound of claim 1 wherein R is fluoro.
5. The compound of claim 1 wherein R is amino.
6. The method of preparing a compound of the formula:

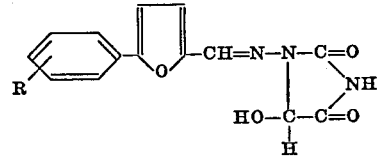

wherein R is the 4-position is nitro, chloro, fluoro or cyano; in the 3-position trifluoromethyl and in the 3,4-position dichloro which comprises bringing together a compound of the formula:

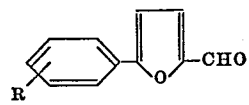

wherein R is as aforesaid and 5-hydroxy-1-aminohydantoin.

7. The compound of claim 1 wherein R is cyano.
8. The compound of claim 1 wherein R is trifluoromethyl.
9. The compound of claim 1 wherein R is 3,4-dichloro.

References Cited

UNITED STATES PATENTS 3,415,821  12/1968  Davis et al. _____ 260—340 G

HENRY R. JILES, Primary Examiner

S. D. WINTERS, Assistant Examiner

U.S. Cl. X.R.

424—273; 260—309.5